US 8,424,819 B2

(12) United States Patent
Tsuzuki et al.

(10) Patent No.: US 8,424,819 B2
(45) Date of Patent: Apr. 23, 2013

(54) FUEL TANK UNIT

(75) Inventors: Hideyuki Tsuzuki, Aichi-ken (JP); Natsushi Miura, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 78 days.

(21) Appl. No.: 12/805,394

(22) Filed: Jul. 29, 2010

(65) Prior Publication Data
US 2011/0024588 A1 Feb. 3, 2011

(30) Foreign Application Priority Data

Jul. 30, 2009 (JP) ................................. 2009-177987

(51) Int. Cl.
*A01M 31/02* (2006.01)
(52) U.S. Cl.
USPC ...... 248/213; 248/315; 248/222.12; 137/202; 137/43
(58) Field of Classification Search ............... 248/213.2, 248/221.11, 222.11, 222.12, 311.2, 315, 248/312, 312.1; 137/202, 493.2, 493.8, 493.3
See application file for complete search history.

(56) References Cited

U.S. PATENT DOCUMENTS

| | | | |
|---|---|---|---|
| 4,952,347 A | 8/1990 | Kasugai | |
| 4,982,757 A * | 1/1991 | Ohasi et al. | 137/202 |
| 5,759,392 A * | 6/1998 | Okabe et al. | 210/232 |
| 6,286,539 B1 * | 9/2001 | Nishi et al. | 137/202 |
| 6,755,206 B2 * | 6/2004 | Nishi et al. | 137/202 |
| 6,913,295 B2 * | 7/2005 | Kimisawa et al. | 285/423 |
| 7,017,607 B2 * | 3/2006 | Brand et al. | 137/587 |
| 7,090,262 B2 * | 8/2006 | Kurihara et al. | 285/423 |
| 7,168,441 B2 * | 1/2007 | Miyoshi et al. | 137/202 |
| 7,171,749 B2 * | 2/2007 | Kaneko | 29/890.12 |
| 7,748,397 B2 * | 7/2010 | Firtion et al. | 137/15.17 |
| 8,261,763 B2 * | 9/2012 | Yamada et al. | 137/202 |
| 8,267,113 B2 * | 9/2012 | Arnalsteen | 137/202 |
| 2004/0238032 A1 * | 12/2004 | Brand et al. | 137/202 |
| 2009/0000669 A1 * | 1/2009 | Kito et al. | 137/202 |
| 2010/0051114 A1 * | 3/2010 | Yamada et al. | 137/202 |
| 2010/0089466 A1 * | 4/2010 | Kobayashi et al. | 137/409 |

FOREIGN PATENT DOCUMENTS

JP 01-301227 A 12/1989

* cited by examiner

*Primary Examiner* — Anita M King
*Assistant Examiner* — Monica Millner
(74) *Attorney, Agent, or Firm* — Posz Law Group, PLC

(57) ABSTRACT

The fuel tank unit includes a fuel cutoff valve fastened to a support body. The support body and the casing of the fuel cutoff valve are made of first and second resin materials having different rates of fuel swelling. The fuel cutoff valve is fastened to the support body via a fastening mechanism. The fastening mechanism entails engaging a first support engaging portion and a second support engaging portion of the support body in first and second fastening engaging portions composed of hooks formed on the casing of the fuel cutoff valve, at first and second hook engagement levels that represent the bite of the hooks. The engaging portions are designed such that prior to fuel swelling of the support body and the base cover first hook engagement exceeds second hook engagement, whereas subsequent to fuel swelling second hook engagement exceeds first hook engagement.

17 Claims, 7 Drawing Sheets

Fig.4

FUEL TANK UNIT

This application claims the benefit of and priority from Japanese Application No. 2009-177987 filed Jul. 30, 2009, the content of which is incorporated herein by reference.

BACKGROUND OF THE INVENTION

1. Field of the Invention

The present invention relates to a fuel tank unit that is adapted to be housed within a fuel tank, and that is equipped with a fuel cutoff valve mounted onto a support body.

2. Description of the Related Art

One known conventional arrangement for a fuel tank unit utilizes screw fastenings, welds, or the like in order to mount the fuel cutoff valve onto the support body (JP-A 1-301227). A problem with prior art is that such arrangements for attaching the fuel cutoff valve to the support body involve a greater number of parts due to the use of screws, or laborious procedures for assembly, welding, and so on.

SUMMARY

An advantage of some aspects of the invention is to provide a fuel tank unit in which a tank component such as a fuel cutoff valve can be attached easily and securely to a support body.

According to an aspect of the invention, there is provided with a fuel tank unit comprising a support body formed of resin material and housed within a fuel tank; a tank component fastened to the support body and having a casing formed of resin material; and a fastening mechanism adapted to fasten the tank component to the support body. The fastening mechanism includes a first and second support engaging portions which are formed on the support body, and a first and second component engaging portions which are formed on the casing. The first component engaging portion engages with the first support engaging portion with a first hook engagement defined as a bite length of hook. The second component engaging portion engages with the second support engaging portion with a second hook engagement defined as a bite length of hook. The first hook engagement is greater than the second hook engagement prior to the support body and the casing experiencing fuel swelling, whereas the second hook engagement is greater than the first hook engagement subsequent to experiencing fuel swelling.

The fuel tank unit according to the first aspect is housed within the fuel tank, with the tank component fastened to the support body through the agency of the fastening mechanism. Because the fastening mechanism has a first and a second support engaging portion which are formed on the support body, and a first and a second component engaging portion which are formed on the tank component, with these components designed to engage through one-touch operation, assembly can be accomplished easily without the need for parts such as screws, and fewer parts are needed.

Attachment of the tank component to the support body is accomplished by respectively engaging the first component engaging portion with the first support engaging portion and engaging the second support engaging portion with the second component engaging portion, bite thereof being designated as first hook engagement and second hook engagement. The fastening mechanism is designed with consideration to fuel swelling at the locations of the engaging portions. Specifically, prior to fuel swelling, the first hook engagement, which represents bite of the engaging portions, is greater than the second hook engagement; whereas subsequent to fuel swelling the second hook engagement is greater than the first hook engagement, with the hook engagements having substantially identical values for the different hooks. Consequently, prior to fuel swelling taking place at the time that the fuel cutoff valve is attached, the first component engaging portion primarily engages the first support engaging portion; whereas subsequent to fuel swelling, despite its shorter hook engagement the hook engagement of the other, second component engaging portion relative to the second support engaging portion increases so that engaging force is maintained irrespective of fuel swelling. Moreover, where such arrangements employ only a single hook, if the hook engagement is too small, the fuel cutoff valve tends to produce chattering during assembly, whereas if the hook engagement is too great, the hook tends to become deformed and damaged due to fuel swelling. According to the present embodiment however, it is not necessary to work out contradictory hook engagement settings for a single hook; rather, because the role is shared by two hooks, hook engagements may be established easily, and productivity may be improved.

In a second aspect, the support body is formed of a resin material with a greater rate of fuel swelling than the tank component. This feature can also be implemented in instances where, though the resin materials have identical rates of fuel swelling, levels of fuel swelling at the different hook locations vary due to the thickness or placement of components.

In a third aspect, the tank component is a fuel cutoff valve adapted to alternately open and cut off the fuel tank interior from the outside, the fuel cutoff valve including a casing that defines a valve chamber and a float mechanism housed within the valve chamber and adapted to rise and fall according to fuel level; the first component engaging portion and the second component engaging portion protrude from the outside wall of the casing, with the hook bite being situated in a mutually facing direction or facing in the opposite direction from the mutually facing direction; and the first support engaging portion and the second support engaging portion are passage holes adapted to engage the hooks.

In a fourth aspect, the casing includes a circular disk base cover supporting the float mechanism; and the first component engaging portion and the second component engaging portion are situated on the bottom face of the base cover, facing at different locations in the radial direction of the base cover.

These and other objects, features, aspects, and advantages of the present invention will become more apparent from the following detailed description of the preferred embodiments with the accompanying drawings.

BRIEF DESCRIPTION OF THE DRAWINGS

DESCRIPTION OF THE PREFERRED EMBODIMENTS (1) General Features of Fuel Tank Unit Attachment Structure FIG. 1 is a sectional view depicting an automotive fuel tank FT having a fuel tank unit equipped with a fuel cutoff valve according to an embodiment of the invention. The fuel tank FT is composed of several laminated layers of resin material, and is manufactured by known methods, namely, extrusion of a cylindrical parison into a die. In the fuel tank FT interior there are arranged a support body 10 and fuel cutoff valves 20, 20A. The support body 10 is a component on which the fuel cutoff valves 20, 20A are respectively installed, and serves to enhance the fuel tank support structure and reduce splashing of fuel. The fuel cutoff valves 20, 20A have so-called in-tank design; the valves are designed to prevent fuel from spilling to the outside if the fuel level in the fuel tank FT rises when the vehicle sways or turns sharply, and are situated at several locations (two in the present embodiment) inside the fuel tank FT. One fuel cutoff valve 20 connects directly to a canister CS via a tube T1, while the other fuel cutoff valve 20A connects to the canister CS via a tube T2 and the fuel cutoff valve 20. Thus, the fuel cutoff valve 20 has two ports for connection to the canister CS and to the other fuel cutoff valve 20A, and differs slightly in construction from the fuel cutoff valve 20A, which has only a single port.

(2) Features of Support Element 10

Figure 2:
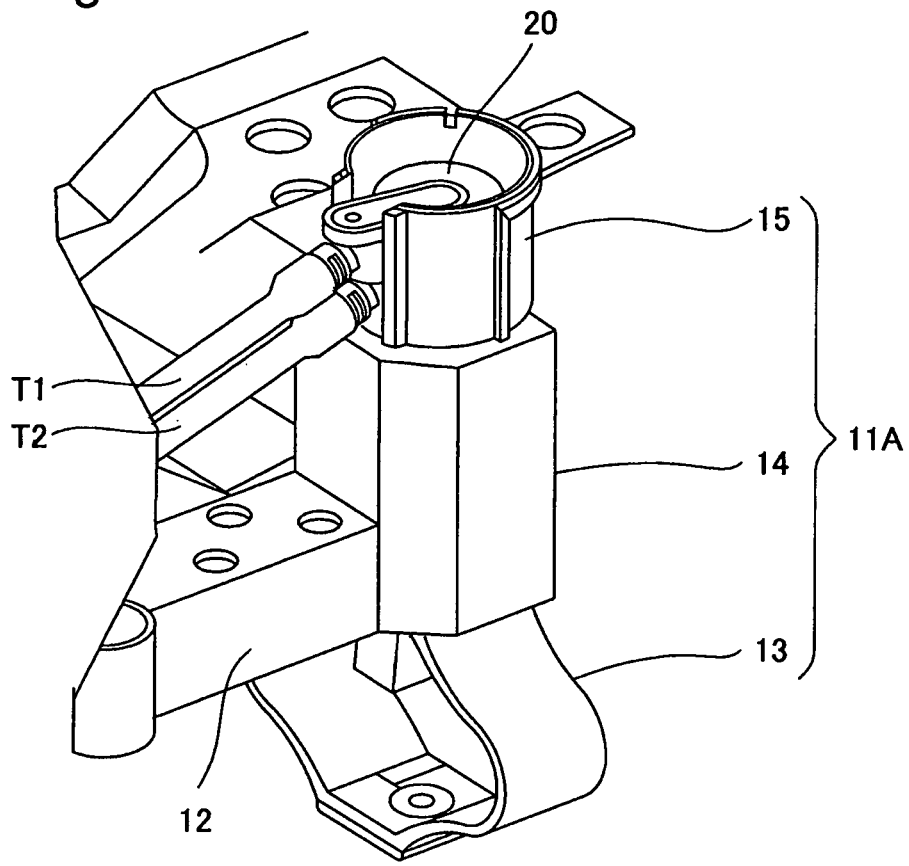
FIG. 2 is a perspective view depicting a support structure of a fuel tank unit.

The support body 10 is composed of two support structures 11A, 11B, and a connecting member 12 that connects the support structures 11A, 11B. The support structures 11A, 11B are substantially identical structures respectively installed on the fuel cutoff valves 20, 20A. FIG. 2 is a perspective view depicting the support structure 11A of the fuel tank unit. The support structure 11A includes a damper portion 13 welded to the bottom wall of the fuel tank; a support post 14 formed at the top of the damper portion 13; and a housing portion 15 formed at the top of the support post 14 and adapted to house the fuel cutoff valve 20. The damper portion 13 is designed to absorb expansion and contraction of the fuel tank and to alleviate transmission of vibration of the fuel tank to the fuel cutoff valve 20.

Figure 3:
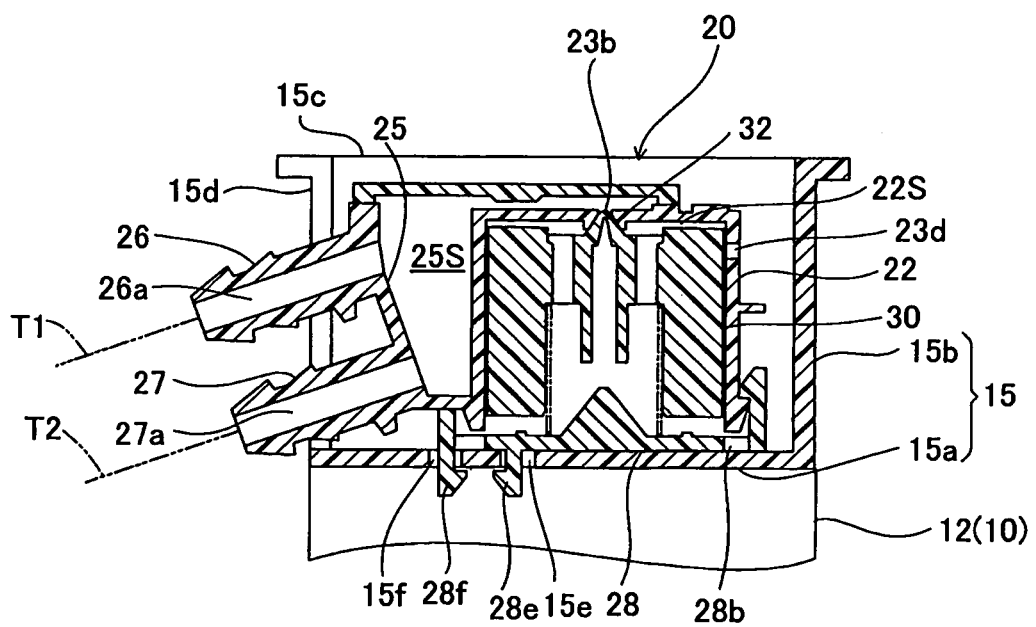
FIG. 3 is a sectional view depicting a fuel cutoff valve housed within a housing portion.

FIG. 3 is a sectional view depicting the fuel cutoff valve 20 housed within the housing portion 15. The housing portion 15 is a member of tubular shape within which the fuel cutoff valve 20 with the perimeter of the fuel cutoff valve 20 covered thereby, thus preventing fuel from washing against the fuel cutoff valve 20; the component includes a mounting plate 15a and a side wall 15b of cylindrical shape projecting upward from the peripheral outside part of the mounting plate 15a, and is open at the top through an upper opening 15b as well as open at the side through a side opening 15d formed in the side wall 15b.

(3) Features of Fuel Cutoff Valve 20

Figure 4:
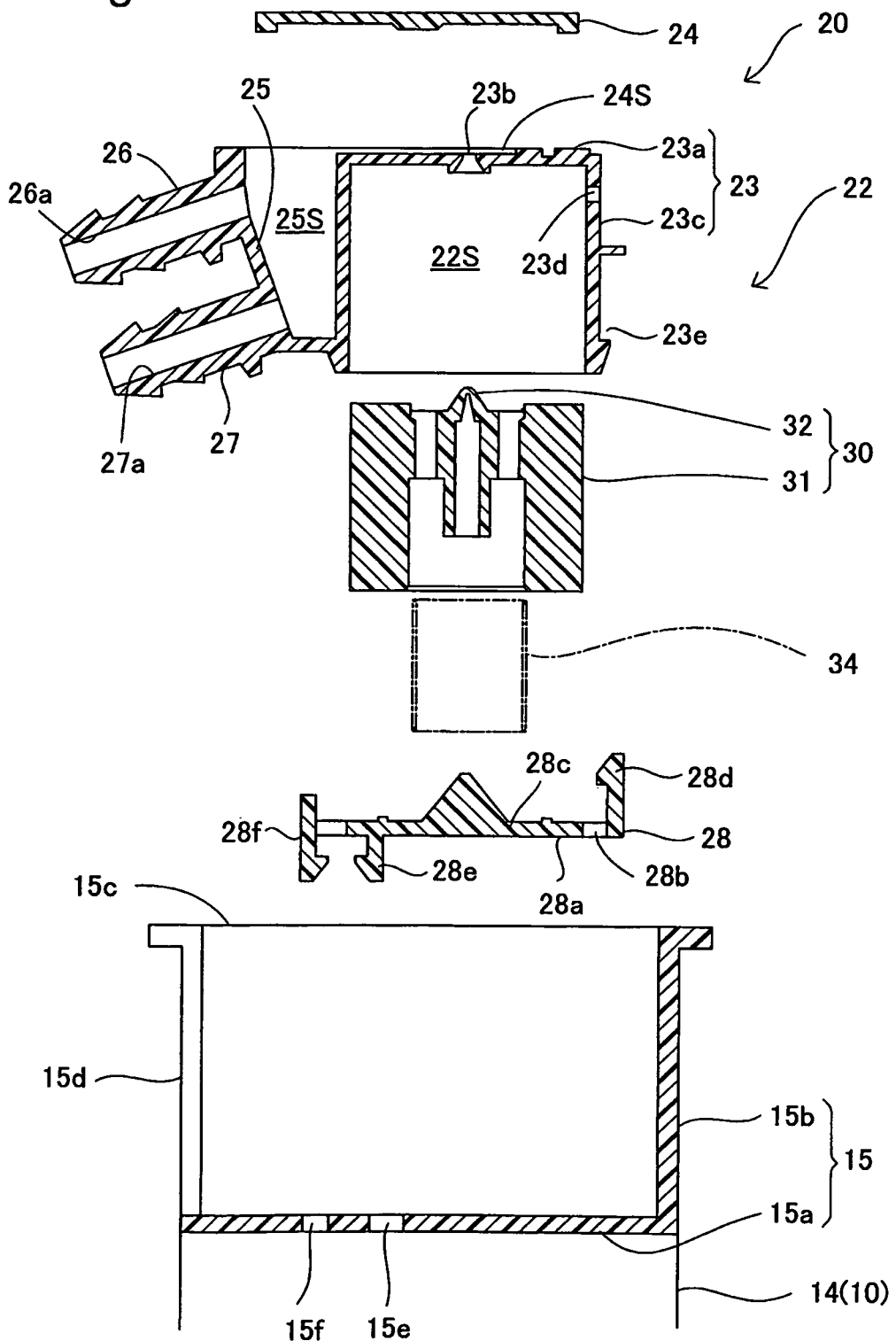
FIG. 4 is an exploded sectional view of a fuel cutoff valve.

FIG. 4 is an exploded sectional view of the fuel cutoff valve 20. The fuel cutoff valve 20 in FIG. 4 is composed primarily of a casing 22, a float mechanism 30, and a spring 34. The casing 22 includes a casing body 23 of tubular shape, an upper cover 24 attached to the top of the casing body 23 and defining an upper chamber 24S above the casing body 23; and a base cover 28 installed at the bottom of the casing body 23, with the casing body 23 and the base cover 28 defining a valve chamber 22S. A connecting passage 23b is formed in the center part of an upper wall 23a of the casing body 23, and a vent hole 23d is formed in a side wall 23c. A communicating chamber 25S is also formed in the side part of the casing body 23. The communicating chamber 25S is situated to the side of the valve chamber 22S, by virtue of a passage-defining wall 25 formed from the side part of the casing body 23. The communicating chamber 25S is open at the top, and is delineated by the upper cover 24 and the passage-defining wall 25.

Figure 1:
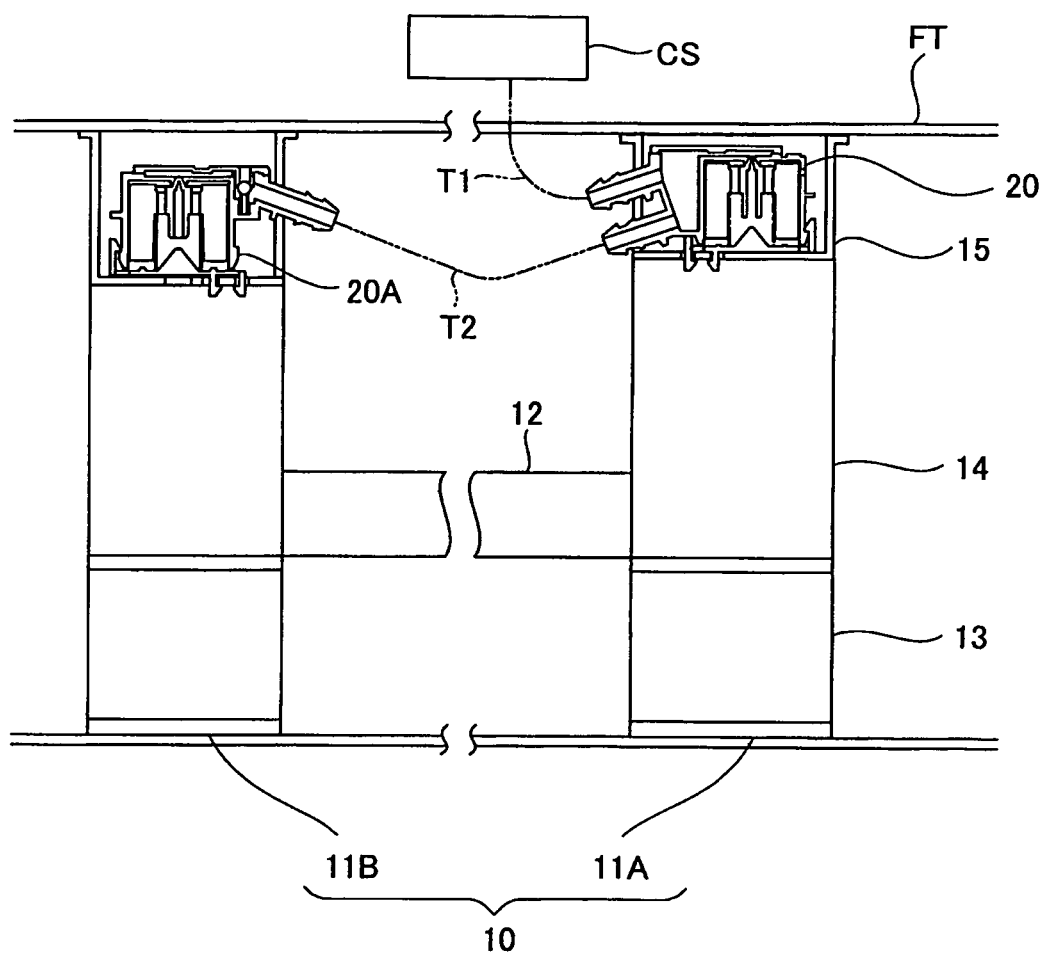
FIG. 1 is a sectional view depicting an automotive fuel tank having a fuel tank unit equipped with a fuel cutoff valve according to an embodiment of the invention.

A first pipe portion 26 protrudes diagonally downward from the side part of the passage-defining wall 25. A pipe passage 26a is formed within the first pipe portion 26, and this pipe passage 26a connects at one end to the fuel tank FT interior via the communicating chamber 25S, the upper chamber 24S, the connecting passage 23b, and the valve chamber 22S; and at the other end to the canister end via the tube T1 (FIG. 1). A second pipe portion 27 having a pipe passage 27a parallel to the first pipe portion 26 protrudes out below the first pipe portion 26. The second pipe portion 27 is situated at the same location in the circumferential direction of the casing 22 as is the first pipe portion 26, and is arranged parallel to it in the vertical direction, and connects via the tube T2 to the other fuel cutoff valve 20A situated inside the fuel tank.

The base cover 28 includes a base cover body 28a of round disk shape, a communication hole 28b formed in the base cover body 28a, a spring support portion 28c formed on the upper face of the base cover body 28a, and a main body-side engaging portion 28d. The main body-side engaging portion 28d is composed of hooks protruding upward at three locations (only one is shown in the drawing), and is designed to attach the base cover 28 to the casing body 23 by engaging a valve-side engaged portion 23e that takes the form of a step formed on the side wall of the casing body 23.

Figure 5:
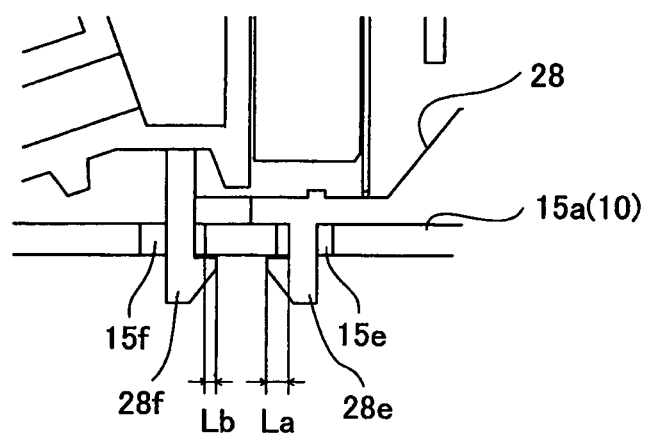
FIG. 5 is a sectional view of the area around a fuel tank unit fastening mechanism.

FIG. 5 is a sectional view of the area around the base cover 28, shown mounted onto the mounting plate 15a of the support body 10. The base cover 28 is mounted onto the mounting plate 15a by a fastening mechanism. The fastening mechanism includes a first support engaging portion 15e and a second support engaging portion 15f constituted by passage holes formed in the mounting plate 15a; and a first component engaging portion 28e adapted to engage the first support engaging portion 15e and a second component engaging portion 28f adapted to engage the second support engaging portion 15f, these being composed of hooks respectively formed on the base cover 28. The first support engaging portion 15e and the first component engaging portion 28e have a first hook engagement La which represents the bite length of the hook. The second support engaging portion 15f and the second component engaging portion 28f have a second hook engagement Lb which represents the bite length of the hook.

The float mechanism 30 includes a float body 31 housed within the valve chamber 22S; a valve portion 32 of substantially conical shape projects from the top thereof. The valve portion 32 is designed to alternately open and close the connecting passage 23b through rising and falling of the float body 31. The spring 34 is supported by the spring support portion 28c of the base cover 28, and urges the float mechanism 30 upwards.

By virtue of the design of the fuel cutoff valve 20, as depicted in FIG. 3, fuel vapors collecting at the top of the fuel tank interior as the fuel level in the fuel tank rises escape towards the canister through the vent hole 23d in the casing 22, the communication hole 28b in the base cover 28, the valve chamber 22S, the connecting passage 23b, the connecting chamber 25S, and the pipe passage 26a, and then through the tube T1. If the fuel level inside the fuel tank FT reaches a certain prescribed level due to swaying or rocking of the vehicle, fuel inflows to the valve chamber 22S through the communication hole 28b in the base cover 28. The float mechanism 30 thus gives rise to buoyancy and ascends, whereupon the valve portion 32 of the float mechanism 30 closes off the communicating passage 23b so that the fuel does not flow out towards the canister.

(4) Attachment Structure of Fuel Cutoff Valve 20 and Support Element 10

After its various components are assembled, the fuel cutoff valve 20 is fastened to the support body 10. Specifically, the upper cover 24 is welded to the top of the casing body 23, and then with the float mechanism 30 and the spring 34 housed inside, the base cover 28 is attached to the casing body 23 by engaging the body-side engaging portion 28d of the base cover 28 with the valve-side engaged portion 23e. Then, as depicted in FIG. 5, the assembled fuel cutoff valve 20 is secured to the housing portion 15 by respectively engaging the first component engaging portion 28e of the base cover 28 in the first support engaging portion 15e of the mounting plate 15a of the support body 10, and engaging the second component engaging portion 28f in the second support engaging portion 15f. Then, after installing the fuel cutoff valve 20A on the support body 10 in the same manner, the tube T1 and the tube T2 are connected to the first and second pipe portions 26, 27 of the fuel cutoff valve 20. This assembly is welded to the parison and to the top end of the support body 10 during the blow molding process by positioning it inside the parison and closing the mold.

(5) Effect of the Embodiment

The features of the preceding embodiment afford the following effects in addition to those described above.

(5)-1 The first component engaging portion 28e and the second component engaging portion 28f are integrally formed on the base cover 28 to provide the means for fastening the fuel cutoff valve 20 to the support body 10, that is, the base cover 28 is provided not only with engaging means for engaging the casing body 23, but with engaging means for engaging the housing portion 15 as well. Through this design, the fuel cutoff valve 20 can be easily attached to the housing portion 15 by a one-touch operation involving engaging the first component engaging portion 28e and the second component engaging portion 28f in the first support engaging portion 15e and the second support engaging portion 15f of the housing portion 15. Moreover, component such as screws are not needed to fasten the housing portion 15 and the fuel cutoff valve 20, so there are fewer parts.

(5)-2 As shown in FIG. 5, the base cover 28 of the fuel cutoff valve 20 is mounted onto the mounting plate 15a of the support body 10 by engaging the first component engaging portion 28e in the first support engaging portion 15e and engaging of the second support engaging portion 15f in the second component engaging portion 28f respectively, with bite thereof being represented as first hook engagement La and second hook engagement Lb. The mounting plate 15a is made from polyethylene, and the base cover 28 is made from polyacetal, which has a lower fuel swelling rate than polyethylene. In consideration of this difference in the fuel swelling rate, the fastening mechanism is constituted as follows.

Figure 6A:
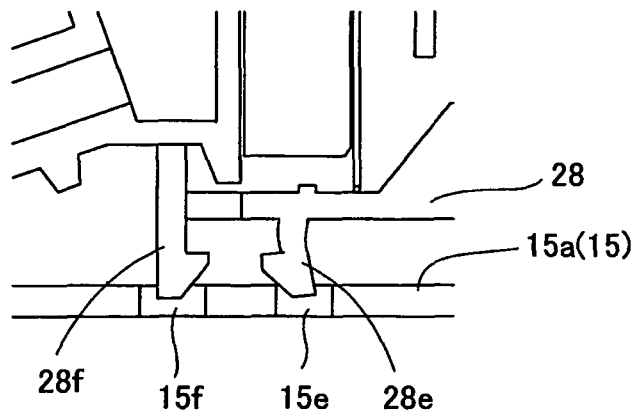
FIGS. 6A, 6B and 6C show the operation of a fuel tank unit fastening mechanism.
Figure 6B:
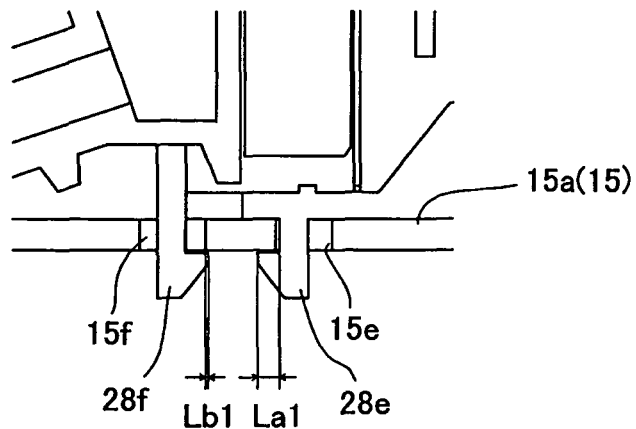
Figure 6C:
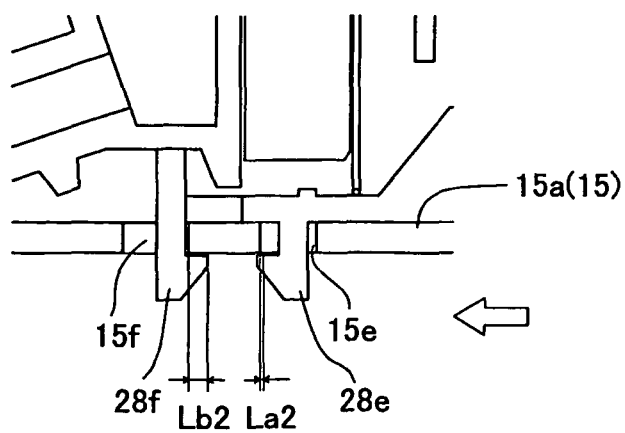

FIG. 6B depicts the fastening mechanism prior to fuel swelling of the mounting plate 15a and the fuel cutoff valve 20; FIG. 6C depicts the fastening mechanism subsequent to fuel swelling of the mounting plate 15a and the fuel cutoff valve 20. The first hook engagement La of the first component engaging portion 28e prior to fuel swelling is denoted as La1 and that subsequent to fuel swelling as La2; the second hook engagement Lb of the second component engaging portion 28f prior to fuel swelling is denoted as Lb1 and that subsequent to fuel swelling as Lb2. The relationships of these hook engagement values are La1>La2, Lb1<Lb2, with La1 and Lb2 being substantially equal. That is, prior to fuel swelling the first hook engagement La1 is greater than the second hook engagement Lb2, whereas subsequent to fuel swelling the second hook engagement Lb is greater than the first hook engagement La, with the hook engagement values being substantially equal for the different hooks. Consequently, prior to fuel swelling which takes place at the time that the fuel cutoff valve 20 is attached, the first component engaging portion 28e primarily engages the first support engaging portion 15e, whereas subsequent to fuel swelling, despite decrease of hook engagement thereof from La1 to La2, the hook engagement of the other, second component engaging portion 28f relative to the second support engaging portion 15f increases so that engaging force is maintained irrespective of fuel swelling. Moreover, where such arrangements employ only a single hook, if the hook engagement is too small the fuel cutoff valve 20 tends to produce chattering during assembly, whereas if the hook engagement is too great the hook tends to become deformed and damaged due to fuel swelling. According to the present embodiment however, it is not necessary to work out contradictory hook engagement settings for a single hook; rather, because the role is shared by two hooks, hook engagements may be established easily, and productivity may be improved.

(6) Additional Embodiments

It is to be understood that there is no intention to limit the invention to the embodiment disclosed hereinabove, and that modifications such as the following are to be included among various possible alternative modes considered to fall within the spirit and scope of the invention.

Figure 7A:
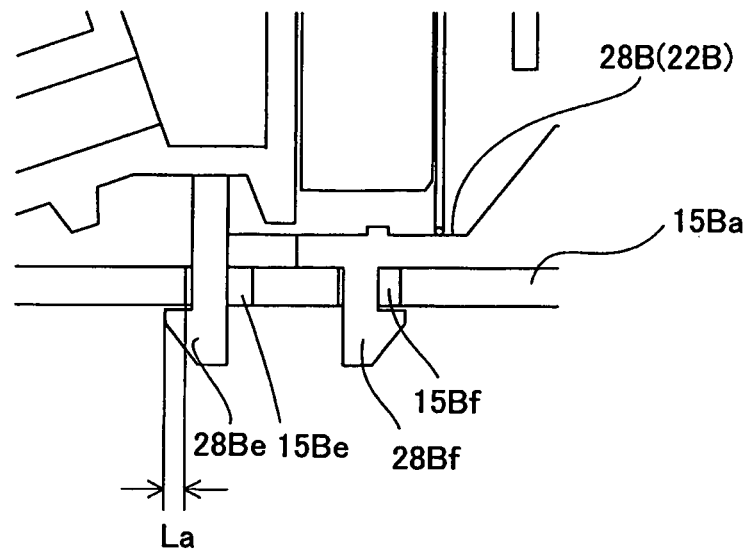
FIGS. 7A and 7B are sectional views of a fuel tank unit according to another embodiment.
Figure 7B:
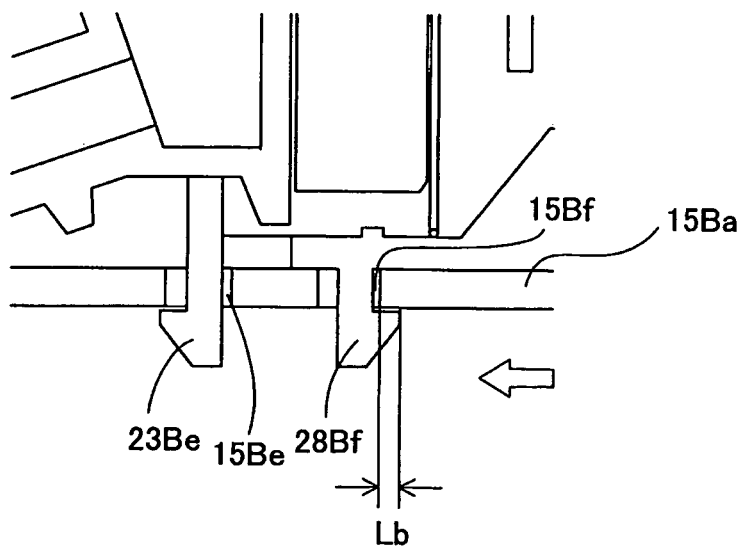

(6)-1 FIGS. 7A and 7B are sectional views of a fuel tank unit according to another embodiment. The present embodiment features a particular orientation of the hooks of the fastening mechanism that is formed on a base cover 28B of a casing 22B. Specifically, a first component engaging portion 28Be and a second component engaging portion 28Bf composed of hooks are formed on the bottom face of the base cover 28B so as to be respectively engaged by a first support engaging portion 15e and a second support engaging portion 15f composed of apertures, and with the hook bite regions situated in the opposite direction from the facing direction. According to the present embodiment, prior to fuel swelling in FIG. 7 (A), the first component engaging portion 28Be has a large first hook engagement La, whereas subsequent to fuel swelling in FIG. 7 (B), the second component engaging portion 28Bf has a large second hook engagement Lb, so that the fuel cutoff valve is dependably secured to a mounting plate 15Ba both before and after fuel swelling.

Figure 8:
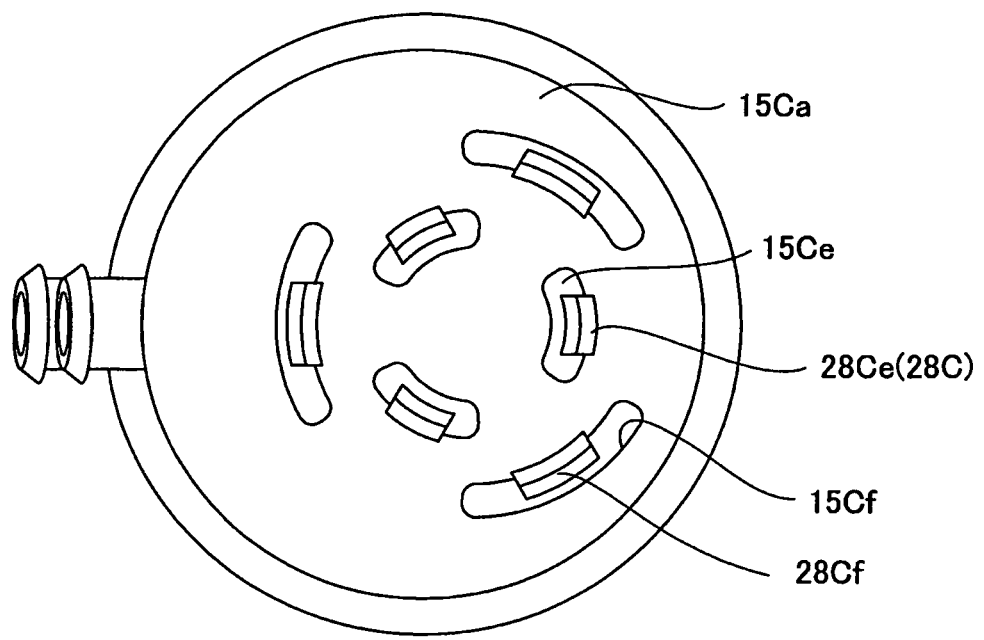
FIG. 8 is a bottom view of a fuel tank unit according to yet another embodiment.

(6)-2 FIG. 8 is a bottom view of a fuel tank unit according to yet another embodiment. The present embodiment features a particular placement of the engagement sites of the fastening mechanism for interlocking the casing and the mounting plate. Specifically, first component engaging portions 28Ce and second component engaging portions 28Cf composed of hooks are formed on the bottom face of the base cover 28B; and first support engaging portions 15Ce and second support engaging portions 15Cf composed of apertures are formed in a mounting plate 15Cf. Where the engagement sites of the first support engaging portions 15Ce and the first component engaging portions 28Ce are denoted as first engagement locations, and the engagement sites of the second support engaging portions 15Cf and the second component engaging portions 28Cf are denoted as second engagement sites, the first engagement sites are positioned differently in the circumferential direction relative to the second engagement sites. Specifically, the first and second engagement sites are respectively situated at three locations spaced 120° apart in the circumferential direction, with placement of the first engagement sites differing by 60° from that of the second engagement sites. According to this feature, distances between the first support engaging portions 15Ce and the second support engaging portions 15Cf are greater, and the mechanical strength of the mounting plate 15Ca may be increased.

(6)-3 While the preceding embodiments described fuel cutoff valves as tank components, no limitation is imposed thereby, and the invention is applicable to other components housed within a fuel tank, such as a pump for example.

(6)-4 While the preceding embodiments employed resin materials with different rates of fuel swelling, no limitation is imposed thereby, and the invention is applicable to hooks of fastening mechanisms made of identical resin material, but formed as locations with different levels of fuel swelling.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A fuel tank unit comprising a support body formed of resin material and housed within a fuel tank; a tank component fastened to the support body; and a fastening mechanism adapted to fasten the tank component to the support body,
   wherein the tank component is a fuel cutoff valve adapted to open and close a passage that connects the fuel tank interior to outside, wherein the fuel cutoff valve includes (i) a casing that is formed of resin material and defines a valve chamber and (ii) a float mechanism housed within the valve chamber and adapted to rise and fall according to fuel level, the casing including a circular disk base cover supporting the float mechanism, and
   the fastening mechanism includes:
   first and second component engaging portions that protrude from a bottom of the base cover with a hook respectively, each bite portion of the hooks being situated in a mutually facing direction, and
   first and second support engaging portions including apertures formed at the support body and adapted to engage the hooks respectively,
   wherein a first hook engagement is greater than a second hook engagement prior to fuel swelling of the support body and the casing, whereas the second hook engagement is greater than the first hook engagement after fuel swelling of the support body and the casing,
   the first hook engagement is defined as a bite length of which the hook of the first component engaging portion is engaged with the first support engaging portion, and
   the second hook engagement is defined as a bite length of which the hook of the second component engaging portion is engaged with the second support engaging portion.

2. The fuel tank unit according to claim 1 wherein the support body is formed of a resin material with a greater rate of fuel swelling than that of the tank component.

3. The fuel tank unit according to claim 1 wherein the first component engaging portion and the second component engaging portion are situated on the bottom face of the base cover and at different locations in a radial direction of the base cover.

4. The fuel tank unit according to claim 1 wherein the first component engaging portion and the second component engaging portion are situated on the bottom face of the base cover and at different locations in a circumferential direction of the base cover.

5. The fuel tank unit according to claim 1 wherein the tank component is a fuel cutoff valve adapted to open and close a passage that connects the fuel tank interior to outside, wherein the fuel cutoff valve includes (i) a casing that defines a valve chamber and (ii) a float mechanism housed within the valve chamber and adapted to rise and fall according to fuel level, the casing including a circular disk base cover supporting the float mechanism, and
   the first component engaging portion and the second component engaging portion are situated on the casing and at different locations in a radial direction of the base cover.

6. The fuel tank unit according to claim 1 wherein the tank component is a fuel cutoff valve adapted to open and close a passage that connects the fuel tank interior to outside, wherein the fuel cutoff valve includes (i) a casing that defines a valve chamber and (ii) a float mechanism housed within the valve chamber and adapted to rise and fall according to fuel level, the casing including a circular disk base cover supporting the float mechanism, and
   the first component engaging portion and the second component engaging portion are situated on the casing and at different locations in a circumferential direction of the base cover.

7. The fuel tank unit according to claim 1, wherein the first and second support engaging portions and the first and second component portions constitute an engaging combination, the engaging combinations are disposed along the circumferential direction at multiple locations in a prescribed distance away from a center of the disk base cover.

8. The fuel tank unit according to claim 1, wherein bite lengths of the hooks of the first and second component engaging portions are substantially the same.

9. A fuel tank unit comprising:
   a support body formed of resin material having a lower fuel swelling rate, the support body housed within a fuel tank;
   a tank component fastened to the support body and having a casing formed of resin material having a higher fuel swelling rate; and
   a fastening mechanism adapted to fasten the tank component to the support body, the fastening mechanism including:
   first and second component engaging portions that protrude from a bottom of the casing with the hooks respectively; and
   first and second support engaging portions including apertures formed on the support body and adapted to engage the hooks in varying amounts, respectively,
   wherein the support body and the casing have two configurations including a non-swelled configuration where the support body and the casing are out of contact with fuel and a swelled configuration where the support body and casing are in contact with fuel, and in the non-swelled configuration, a first hook engaging amount is greater than a second hook engaging amount, and in the swelled configuration, the second hook engaging amount is greater than the first hook engaging amount.

10. The fuel tank unit according to claim 9 wherein a bite length of the hooks of the first and second component engaging portions are substantially the same.

11. The fuel tank unit according to claim 9 wherein each bite portion of the hooks is situated in a mutually facing direction.

12. The fuel tank unit according to claim 9, wherein the tank component is a fuel cutoff valve adapted to open and close a passage that connects the fuel tank interior to outside, wherein the fuel cutoff valve includes (i) a casing that defines a valve chamber and (ii) a float mechanism housed within the valve chamber and adapted to rise and fall according to fuel level, the casing including a circular disk base cover supporting the float mechanism, and the first component engaging portion and the second component engaging portion protrude from a bottom of the base cover with the hooks respectively, each bite portion of the hooks being situated in an opposite direction.

13. The fuel tank unit according to claim 12 wherein the first component engaging portion and the second component engaging portion are situated on the bottom face of the base cover and at different locations in a radial direction of the base cover.

14. The fuel tank unit according to claim 12 wherein the first component engaging portion and the second component engaging portion are situated on the bottom face of the base cover and at different locations in a circumferential direction of the base cover.

15. The fuel tank unit according to claim 9, wherein the tank component is a fuel cutoff valve adapted to open and close a passage that connects the fuel tank interior to outside, wherein the fuel cutoff valve includes (i) a casing that defines a valve chamber and (ii) a float mechanism housed within the valve chamber and adapted to rise and fall according to fuel level, the casing including a circular disk base cover supporting the float mechanism, the first component engaging portion and the second component engaging portion protrude from a bottom of the base cover with the hooks respectively, each bite portion of the hooks being situated in an opposite direction.

16. The fuel tank unit according to claim 15 wherein the first component engaging portion and the second component engaging portion are situated on the bottom face of the base cover and at different locations in a radial direction of the base cover.

17. The fuel tank unit according to claim 15 wherein the first component engaging portion and the second component engaging portion are situated on the bottom face of the base cover and at different locations in a circumferential direction of the base cover.

* * * * *